(12) United States Patent
Korsgaard et al.

(10) Patent No.: US 11,121,387 B2
(45) Date of Patent: Sep. 14, 2021

(54) BURNER EVAPORATOR FOR A FUEL CELL SYSTEM

(71) Applicant: SERENERGY A/S, Aalborg (DK)

(72) Inventors: Anders Risum Korsgaard, Aalborg (DK); Mads Bang, Skorping (DK)

(73) Assignee: SERENERGY A/S

( * ) Notice: Subject to any disclaimer, the term of this patent is extended or adjusted under 35 U.S.C. 154(b) by 772 days.

(21) Appl. No.: 15/324,968

(22) PCT Filed: Jul. 16, 2015

(86) PCT No.: PCT/DK2015/000025
§ 371 (c)(1),
(2) Date: Jan. 9, 2017

(87) PCT Pub. No.: WO2016/008486
PCT Pub. Date: Jan. 21, 2016

(65) Prior Publication Data
US 2017/0222240 A1    Aug. 3, 2017

(30) Foreign Application Priority Data

Jul. 16, 2014  (DK) .............................. PA201400393

(51) Int. Cl.
| | |
|---|---|
| *H01M 8/241* | (2016.01) |
| *H01M 8/0612* | (2016.01) |
| *C01B 3/32* | (2006.01) |
| *F23D 11/44* | (2006.01) |
| *B01D 1/00* | (2006.01) |
| *B01B 1/00* | (2006.01) |
| *H01M 8/04007* | (2016.01) |
| *H01M 8/04701* | (2016.01) |

(52) U.S. Cl.
CPC ........... *H01M 8/0631* (2013.01); *B01B 1/005* (2013.01); *B01D 1/0058* (2013.01); *C01B 3/323* (2013.01);
(Continued)

(58) Field of Classification Search
None
See application file for complete search history.

(56) References Cited

U.S. PATENT DOCUMENTS 7,045,232 B1 *   5/2006  Duebel ............... H01M 8/0612
                                                              429/412
2003/0217506 A1 * 11/2003  Dieckmann ............ C01B 3/382
                                                              44/412
(Continued)

FOREIGN PATENT DOCUMENTS

| CN | 1649665 A  *  8/2005 | ............. C01B 3/384 |
| DE | 102007030605 A1   1/2009 | |

(Continued)

OTHER PUBLICATIONS

PCT International Search Report for PCT International Patent Application No. PCT/DK2015/000025, dated Nov. 11, 2015.

*Primary Examiner* — Jonathan Crepeau
*Assistant Examiner* — Angela J Martin
(74) *Attorney, Agent, or Firm* — Holland & Hart LLP

(57) ABSTRACT

A fuel cell system comprising a fuel cell stack, an evaporator for evaporating a mixture of methanol and water to be forwarded through a catalytic reformer for producing portions of free hydrogen. The fuel cell stack being composed of a number of proton exchange membrane fuel cells each featuring electrodes in form of an anode and a cathode for delivering an electric current. The liquid fuel using a. pre-evaporator, which. partly evaporates the fuel, followed by a. nozzle, which atomizes the fuel into a fine mist, before being passed to the final evaporation zone. This configuration ensures that liquid fuel for producing thermal, neat is converted into a form that facilitates a burner to achieve a quick heating up of the fuel, cell system into production mode.

19 Claims, 3 Drawing Sheets

(52) U.S. Cl.
CPC ....... *F23D 11/443* (2013.01); *H01M 8/04067* (2013.01); *H01M 8/04731* (2013.01); *H01M 8/0618* (2013.01); *H01M 8/241* (2013.01); *C01B 2203/0233* (2013.01); *C01B 2203/066* (2013.01); *C01B 2203/0811* (2013.01); *C01B 2203/1223* (2013.01); *C01B 2203/1288* (2013.01); *C01B 2203/1294* (2013.01)

(56) References Cited

U.S. PATENT DOCUMENTS

| | | | |
|---|---|---|---|
| 2003/0223926 A1* | 12/2003 | Edlund | F23D 14/22 422/198 |
| 2005/0079462 A1* | 4/2005 | Sennoun | F23D 11/402 431/243 |
| 2009/0205253 A1* | 8/2009 | Edlund | H01M 8/04022 48/76 |
| 2011/0256491 A1* | 10/2011 | Edlund | B01J 8/0221 431/207 |
| 2014/0193759 A1 | 7/2014 | Weber | |

FOREIGN PATENT DOCUMENTS

| | | | | |
|---|---|---|---|---|
| EP | 1516663 A2 | * | 3/2005 | ................ B01J 8/02 |
| JP | 2005100772 | * | 4/2005 | ................ C01B 3/34 |
| WO | 0022690 A1 | | 4/2000 | |
| WO | WO 00/22690 | * | 4/2000 | ............ H01M 8/22 |
| WO | 2012106048 A1 | | 8/2012 | |

* cited by examiner

BURNER EVAPORATOR FOR A FUEL CELL SYSTEM

TECHNICAL FIELD

The present invention is generally concerned with the art of generating electrical energy by means of fuel cells. More specifically, it relates to a fuel cell system comprising a fuel cell stack, an evaporator for evaporating a mixture of methanol and water to be fed through a catalytic reformer for producing portions of free hydrogen, the fuel cell stack being composed of a number of proton exchange membrane fuel cells each featuring electrodes in form of an anode and a cathode for delivering an electric current, the reaction of free hydrogen into ionic form with contact to the anode being proportional to the flow of electric current between the electrodes.

BACKGROUND OF THE INVENTION

Electrochemically, a fuel cell converts a raw fuel into electrical energy and heat and will continue the production as long as raw fuel is being continuously supplied.

The basic conversion technology of fuel cells is well known for at least a century but has come into a renaissance with the latest development and demands for fuel saving and environmental friendly technology. Additionally fuel cell technology is advantageous for electrical supply on mobile or remote platforms and for backup solutions.

Briefly explained, using the protone exchange membrane technology, a fuel cell needs a supply of hydrogen to be passed along a first electrode, forming the anode, and a supply of oxygen, typically taken directly as atmospheric air, to be passed along a second electrode, forming the cathode. Arranged between the electrodes is an ion-conducting layer, typically a polymer film comprising platine and phosphoric acid. Supplying the hydrogen and oxygen, generates an electrical voltage between the electrodes and a current will be able to flow between the electrodes and supply an attached electrical consumer. Corresponding to the draw of current, a number of hydrogen and oxygen molecules will react, and later when combined in the exhaust the hydrogen ions and oxygen will form water as the end product. Additionally the system will generate heat.

Since the necessary oxygen supply is achieved by taking in sufficient amounts of oxygen containing atmospheric air, the overall need for utilizing a fuel cell is to form a steady and sufficient supply of hydrogen. Supplying hydrogen can possibly be from pressurized cylinders, small or large, but the distribution and storage is critical since hydrogen is a highly explosive gas. Pressurizing hydrogen is quite energy consuming and even in pressurized form hydrogen takes up relatively much space. A better solution is to generate hydrogen directly on the spot by conversion of more stable forms of fuel into a synthetic gas containing high amounts of hydrogen, hereafter called a syngas.

Appreciated is the process of using methanol for producing the hydrogen containing syngas for the obvious advantages when it comes to distribution. The technology describe both low and high temperature fuel cell stacks where a temperature of 120 degrees celcius is the temperature for which the split between the technologies is commonly understood. More specifically a low temperature system commonly works in the temperature area around 70 degrees Celcius and the high temperature system at around 160 degrees Celcius. However, for both technologies apply that the process requires a reformer, for processing the fuel and supplying a syngas containing free hydrogen. The fuel processed is methanol in an aquatic solution, hereafter referenced as liquid fuel. In a first stage, a heater evaporates the liquid fuel and the gas is forwarded to the reformer. The reformer includes a catalyst including copper, which in addition to heat converts the liquid fuel into a syngas mainly consisting of hydrogen with a relatively large content of carbon dioxide and a small content of water mist and carbon monoxide. The syngas is directly useable as a fuel supply for supplying the fuel cell.

Since fuel cell systems are used as a backup solution for other electrical current generating systems, it is of importance that the fuel system has a fast transition time from the cold standby state where no electrical current is produced into production mode where the system is generating the rated nominal current amount.

This is a challenge since a fuel cell system relies on a steady production of hydrogen containing syngas before achieving a stable production mode. This process requires heating of the evaporator and the reformer. Thus for initializing the system, energy in form of heat is needed. In conventional systems, the heat is being provided by electrical heating means. Since normally only a limited amount of electrical energy is available for a backup system, an alternative solution is sought, which still with reference to the prior art requires only a limited amount of electrical energy for the startup process, and further provides an improved solution with a faster transition from the cold standby mode into steady state production mode.

SUMMARY

The overall object of the present invention is to provide a fuel cell system with a fast transition from the cold standby state and into steady state production mode, which takes away the need for electrical energy or only requires a limited amount of electrical energy for the startup process.

This is according to the invention achieved the technical features of the fuel cell system as explained in claim 1.

More specifically the fuel cell system comprises:

A fuel cell stack, a catalytic reformer, an evaporator for evaporating a mixture of methanol and water to be fed through the catalytic reformer for producing portions of free hydrogen, the fuel cell stack being composed of a number of proton exchange membrane fuel cells each featuring electrodes in form of an anode and a cathode for delivering an electric current, the reaction of free hydrogen into ionic form with contact to the anode being proportional to the flow of electric current between the electrodes where the fuel cell system further comprises a fluid fuel burner for providing heat for heating the system to a temperature level on which the fuel cell system can enter a state of steady current production.

In an embodiment, the burner is a conventional flame burner.

In a further embodiment, the burner is a catalytic burner, which in an embodiment is a monolith. A monolithic catalytic burner is understood to be a ceramic device with tubular channels that are coated with a catalyst. Before the catalytic burner can start its heat producing operation, a temperature of about 100 degrees Celsius must be reached. This can be provided by use of electrical heating means arranged in the area around the burner. The electrical heating for reaching the operating temperature will only require a limited amount of electrical energy that can be provided by a battery backup. Appreciated is a battery backup especially intended for powering the startup procedure into steady current production, where the backup battery can be replenished and be ready for another startup of the fuel cell system. This can be achieved by connecting the battery backup to the electrical distribution system via an appropriate interface or by supplying the electrical current from the fuel cell system when it has entered production mode.

In an embodiment, the system further includes a burner fuel evaporator for heating of liquid fuel for the burner, the burner fuel evaporator being arranged in proximity to the burner in such a way that it can absorb energy in form of thermal heat from the burner in order to accelerate the evaporation of liquid fuel into a fine mist of fuel to be led to the burner, for producing thermal heat. Heating the liquid fuel in form of a methanol-water mixture will enhance the production of heat of the burner and facilitate a quick startup of the fuel cell system. Even though thermal heat for heating the liquid fuel is supplied from the burner, the benefit of heating the liquid fuel will be an accelerated heat op of the system into production mode.

More explicitly, the burner fuel evaporator features a first section forming a pre-evaporator, which partly evaporates the liquid fuel into drops, droplets and mist followed by a second section forming a nozzle which atomizes the liquid fuel into a fine mist before being passed to the third section being a path for further heating and stabilizing the liquid fuel into its gas phase.

In an embodiment, the pre-evaporator is formed by at least one well-formed cavity with substantially vertical orientated walls within which cavity is arranged at least one protruding rod, the walls and protruding rod/s are forming heating elements for heating the liquid fuel.

Further in an embodiment, a nozzle which atomizes the liquid fuel into a fine mist is formed by a passage with decreased cross section followed by a passage with enlarged cross section for providing a pressure fall that supports the atomization of liquid fuel into mist.

In an embodiment, the evaporator for heating of liquid fuel for being passed to the reformer is being arranged in such a way that it can absorb energy in form of thermal heat from the burner in order to accelerate the evaporation of liquid fuel into a fine mist of fuel to be led to the reformer for facilitating a quick startup of the fuel cell system.

In an embodiment, the reformer for reforming the liquid fuel into a syngas to be passed to the fuel cell stack is being arranged in such a way that it can absorb energy in form of thermal heat from the burner for facilitating a quick startup of the fuel cell system.

In yet another embodiment the cooling system, for cooling the fuel cell stack, includes a radiator arranged in such a way that it can absorb energy in form of thermal heat from the burner for facilitating a quick startup of the fuel cell system.

As explained and combined, the system is such arranged as to distribute the heat produced by the burner throughout the system until steady state production mode is reached where the sufficient thermal heat for maintaining the system operating temperature is partly provided by the fuel cell stack and partly by burning the waste gas in the burner. Surplus thermal heat is removed from the system by the cooling system.

Further details on the burner fuel evaporator is following with description of several alternative embodiments. In general the evaporator is formed as a well like cavity into which the fluid fuel because of gravity can splash down and be separated into fragments.

More explicitly the cavity is arranged with walls that are shaped substantially vertically or shaped in various forms in order to provide a larger surface area of the wall. The walls can be shaped with edges or drop noses that serve to split-up the liquid fuel into drops, droplets and mist when the liquid fuel are floating down the walls or splashing down through the cavity.

In an embodiment, the evaporator is formed as a cavity with walls that are shaped in such a way that the walls propagation vertically are angled away from the straight vertical line. Thus, they form a channel in which the drops of the liquid fuel forced because of gravity ricochet from wall to wall atomizing and evaporating the drops of liquid fuel into drops, droplets and mist. In other words, the orientation of the pathway in the pre-evaporator is in normal operation shaped substantially vertical but with slightly angled walls from top to bottom.

It has to be understood, that the mentioned orientations are described relatively to a horizontal orientation where the fuel cell system as such are orientated in the orientation of normal intended operation.

Since heat is needed for the evaporation process, the walls are further adapted for serving as heating elements in order to enhance the evaporation process. The choice of a thermal conducting material facilitates this. Additionally the thermal heating of the walls rely on the extent of the surface that are subject to transfer of heat from the burner.

In a further embodiment, rod formed heating elements protruding out into the channel are arranged in the cavity of the evaporator. The rod formed heating elements can protrude in all directions crossing the cavity of the evaporator.

It is appreciated if the shape of the rod formed heating elements can be with a number of sides from triangular shaped over multisided until a substantially round shape is reached.

Further, the shape of the sides of the rod formed heating elements can vary from being flat to a curved or concave form. The curved or concave form will prolong the travel of liquid fuel floating over the surface. The result is that more liquid fuel will be evaporated.

Especially appreciated is an embodiment in which the edges are forming a nose adapted for letting the remaining liquid fuel drip and thus because of gravity collide with protruding parts in the evaporator cavity, this being a rod-like heating element or a wall. The nose can be applied on the rod-like heating element and/or on the wall.

When the drops of liquid fuel falls through the pre-evaporator, they split into smaller drops and ricochet between the walls of the channel and the rod-formed heating elements. The contact with the walls and the rod-formed heating elements is subject to evaporation and atomizing of the fuel into a mist.

In a special embodiment, the rod-formed heating elements are arranged in a matrix within the evaporator cavity.

In a further embodiment the rod-formed heating elements are arranged as a grate comprising at least one rod-formed heating element.

The grate includes in an embodiment several rod-formed heating elements arranged side by side.

In a further embodiment the grate is formed as a net with several rod-formed heating elements arranged side by side and at least one, but possibly more, rod formed heating elements arranged side by side to form cross members to the first set of rod-formed heating elements. In one embodiment, the sets of rod-formed heating elements are forming joints where they cross each other.

The evaporator can be separated into a number of chambers each comprising a gap for passing the liquid fuel drop, and negative angled substantially vertical portion of a wall followed by a positive angled substantially vertical portion of a wall followed by a gap that leads to the next chamber.

In an embodiment, the chamber has at least two mirrored sets of walls where the rod-like heating elements, the grate or matrix of rod-like heating elements are arranged in-between the walls.

As can be seen from the presented embodiments, the distance of travel through the evaporator and the extend of the exposure of the liquid to the surface of the walls and heating rods supports the liquid fuel conforming into drops, droplets and atomized mist and as the fuel further travels through the channel into a fully evaporated gas.

In an embodiment, the gap between the chambers is adapted for forming a pressure nozzle for two-phase atomization of the liquid fuel into the following lower pressure chamber. Allowing the atomized liquid fuel to enter a chamber or cavity with a lower pressure supports the evaporation of the liquid into gas-form effectively.

In a special embodiment, a pressure-reducing nozzle for two-phase atomization forms the last outlet of the pre-evaporator cavity. A channel that is adapted to form a vertical channel for transporting the partly atomized and evaporated liquid fuel into an outlet that function as an inlet for a labyrinth-formed pathway channel follows the nozzle. The mixture of atomized fuel mist and evaporated fuel gas flows together in the vertical channel, trying to escape to the low-pressure cavities arranged further in the travel of the channel of the evaporator. It has the effect as to evaporate parts of the atomized fuel mist into gas and/or to blow the mist into the labyrinth-formed pathway channel. The labyrinth-formed pathway channel heats the evaporated fuel further and secures fully evaporation of the leftovers of the atomized fluid into gas. The walls of the channel including the labyrinth-formed pathway forms the heating elements for heating the evaporated fuel.

More specifically explained evaporation of liquid fuel demands energy in form of heat. Transformation from one phase (liquid) to a second phase (gas) means that water in gas-form expands in volume roughly 1000 times. The energy needed for atomization equals delta pressure times velocity factor of gas-expansion. Further the energy needed for atomization due to surface tension equals area of droplet times Sigma for the liquid fuel. In an embodiment, a heating panel heated electrically provides the energy needed for this two-phase atomization and evaporation, but in an appreciated embodiment, the surplus heat from the fuel cell stack and the waste gas burner serves this purpose of heating the evaporator.

It has to be understood that the modules can be physically made using various methods of production, as e.g. die-casting or by carving out the channels of the modules in a machining process. The overlaying task is to form the burner fuel evaporator module with its characteristic pathways, which arranged in close proximity to the burner facilitates take up of thermal energy for evaporating the liquid burner fuel into a mist providing a better acceptable fuel for the burner and thus facilitates a quicker thermal heating of the system into production mode.

The evaporator module can as explained, preferably be made of aluminum, but the use of other thermal heat conducting materials can be foreseen, such as alloys of iron, stainless steel, magnesium as well as ceramic materials.

BRIEF DESCRIPTION OF THE DRAWINGS

Embodiments of the invention will be described with reference to the accompanying drawing, in which.

DETAILED DESCRIPTION

Figure 1:
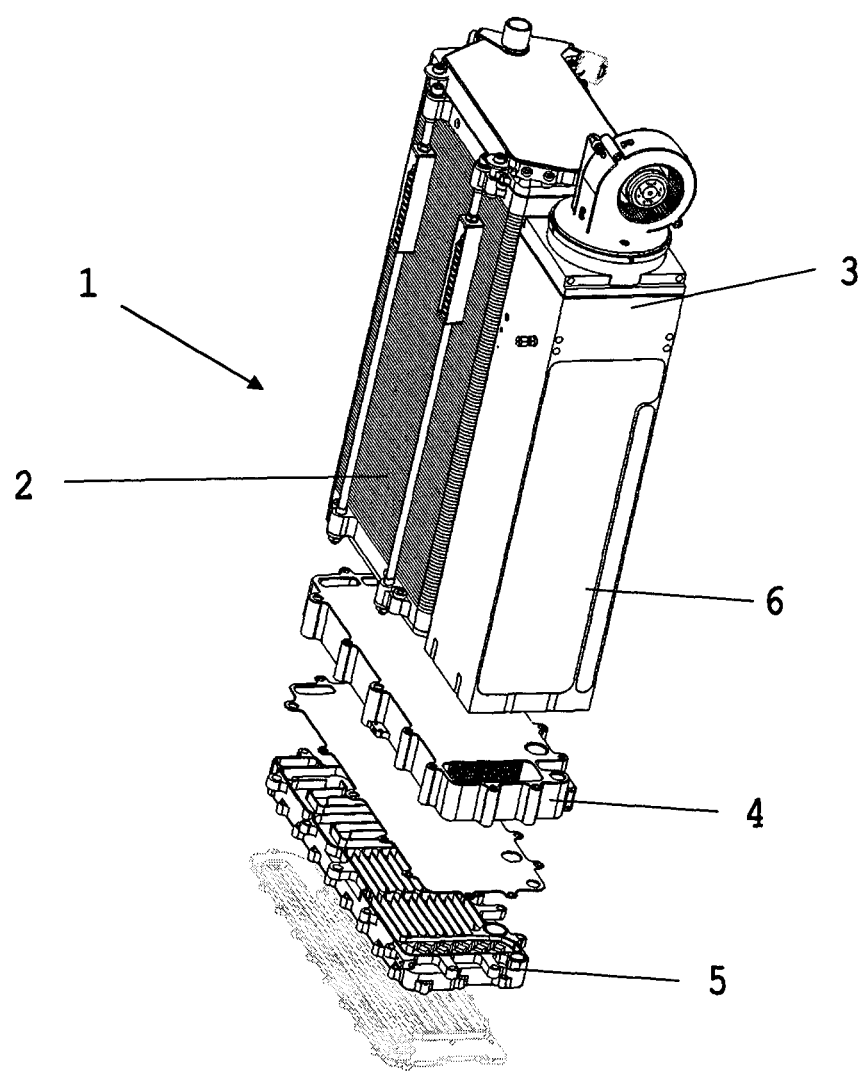
FIG. 1, shows an illustration of a fuel cell system.

FIG. 1, of the drawing shows a fuel cell system 1 comprising a fuel cell stack 2, a number of supporting modules for supplying the fuel cell stack 2 with a modified fuel enabling the fuel cell stack 2 to produce a steady flow of electrical current. The exceed gas supplied to the fuel cell stack 2 but not being converted into electrical current, is fed to the burner 3. The exhaust gas is under normal operating conditions in the temperature area of 500 degrees Celsius and the energy content is recycled for preparing the syngas for fueling the fuel cell stack 2. More detailed, the exhaust is forwarded through the heat exchanger module 4, which takes up the heat from the exhaust and transfer the heat to the neighboring module in the stack here being the evaporator module 5. Further, the heat exchanger module 4 includes a radiator for the transfer of thermal energy in form of heat to the cooling system.

The cooling system serves in the start up phase as to provide thermal energy in form of heat to the fuel cell stack 2 and when the system is up and running to take away excess heat from the fuel cell stack 2. The thermal energy is used for evaporating and reforming the liquid fuel and the surplus is disposed off.

The liquid fuel, a mixture of methanol and water, is processed into a syngas consisting of free hydrogen for use in the fuel cell stack 2. In the evaporator module 5, the fuel is atomized and evaporated into the two-phase stage of the liquid fuel. Further, the evaporated gas is forwarded to the catalytic reformer module 6 that reforms the evaporated gas into a syngas consisting largely of free hydrogen. The catalytic reformer module includes a catalyst including copper, which in addition to heat converts the evaporated liquid fuel into the syngas directly usable by the fuel cell stack 2. The exhaust heat of the fuel cell stack 2 and the waste gas burner 3 is led through channels in the evaporator module 5 and catalytic reformer module 6. The temperature demand in the catalytic reformer 6 is highest, so thus the catalytic reformer 6 is arranged directly behind the burner 3. At a later stage of the exhaust channel the evaporator module 5 takes up the heat from the exhaust in order to evaporate the liquid fuel into gas.

Figure 2:
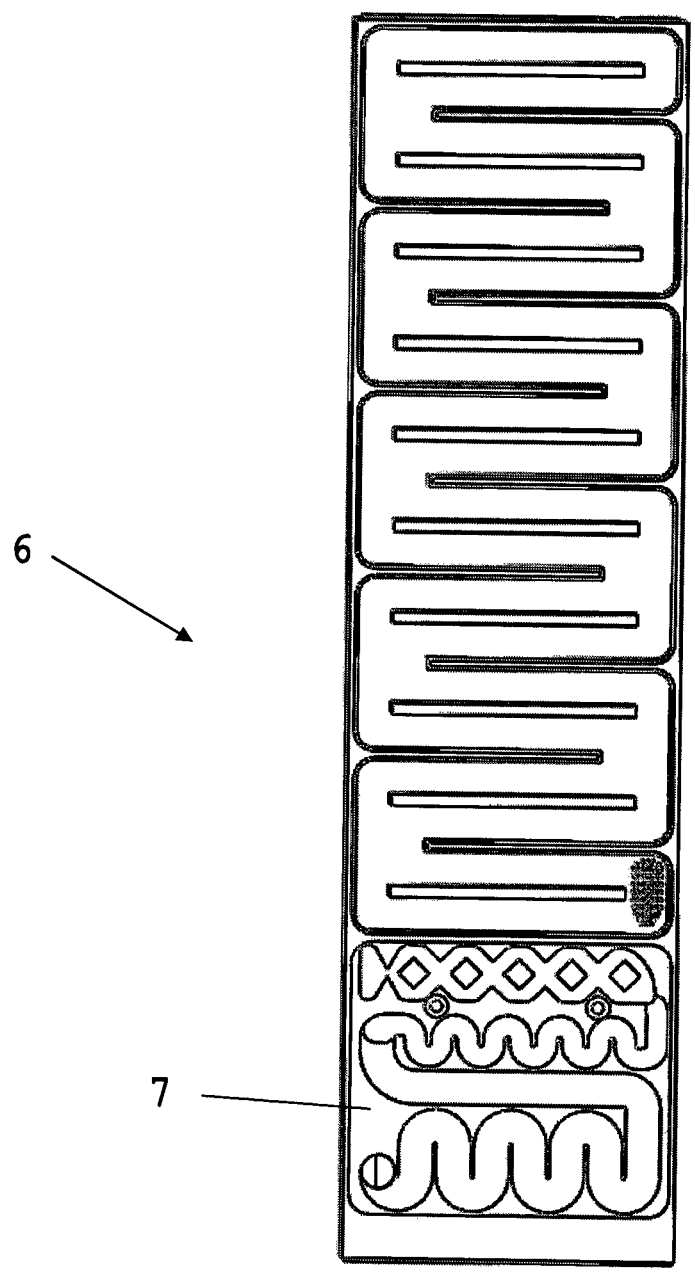
FIG. 2, shows an illustration of a reformer module, with a burner fuel evaporator facility for evaporating liquid fuel into mist suitable for being burned by the burner

The catalytic reformer module 6, shown in FIG. 2 also includes a burner fuel evaporator facility 7 for evaporating liquid fuel into mist suitable for being burned by the burner 3.

Figure 3:
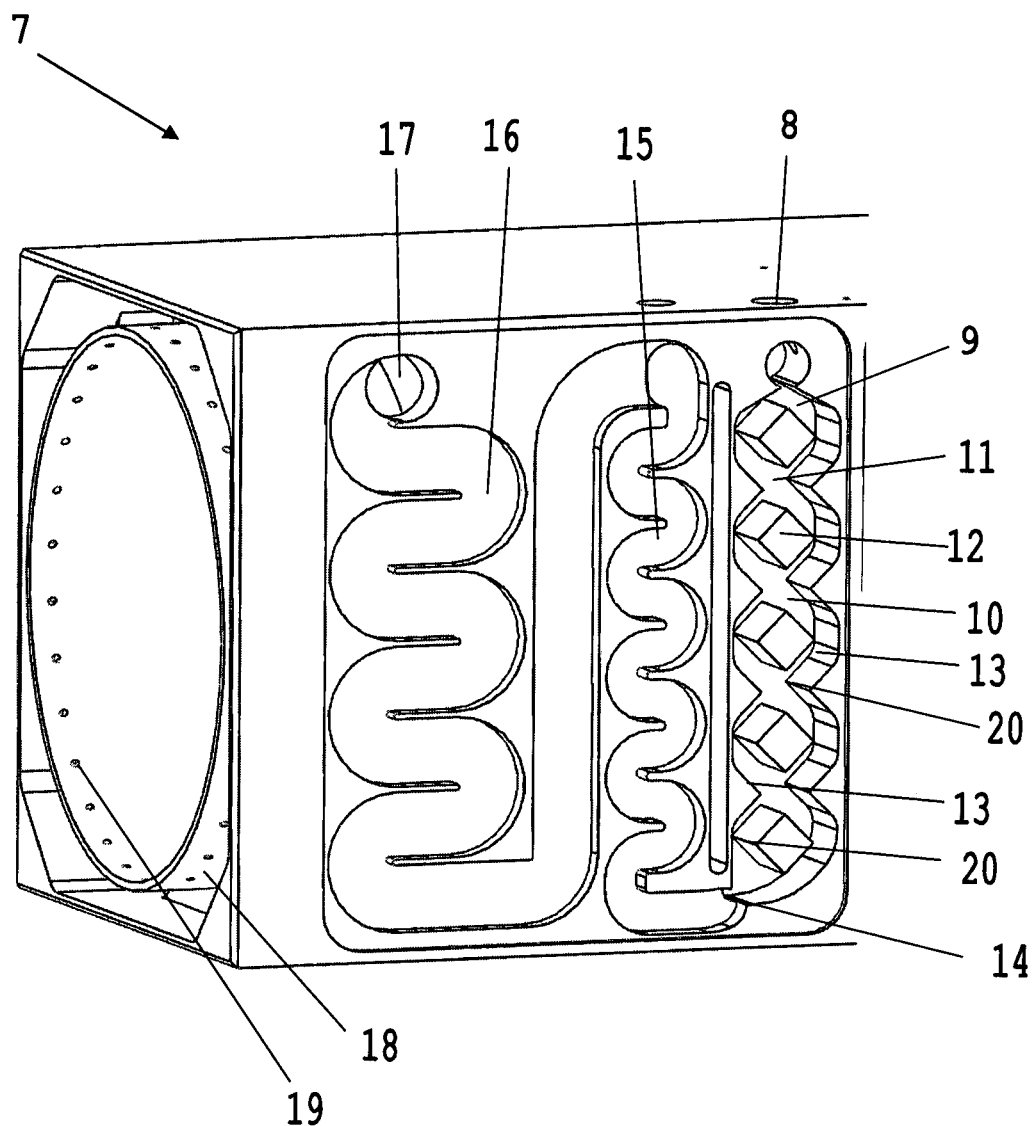
FIG. 3, shows a detailed part of the burner fuel evaporator facility.

A detailed view of the burner fuel evaporator facility 7 is shown in FIG. 3 of the drawing. The liquid fuel is supplied via the inlet hole 8 of the burner fuel evaporator facility 7. The first part of the burner fuel evaporator facility 7 is formed as a pre-evaporator 9 through which the liquid fuel falls forced by gravity. The pre-evaporator 9 is in the present embodiment separated into five chambers 10, which according to specific embodiments could be more or fewer chambers.

When the liquid fuel is supplied via the inlet hole 8, it drops down in the first chamber and is further forwarded to the next chamber via a gap 11. The drop splashes into the next chamber 10 where it will hit a protruding rod 12. The protruding rod 12 serves partly as a heating element, and partly to atomize and evaporate the liquid fuel into droplets and mist. Since the droplets because of gravity fall further down the pre-evaporator 9, more protruding rods 12 are hit and the effect of evaporation is increased. As can be seen, the walls 13 of the pre-evaporator 9 are vertically angled in order to embrace the protruding rods 12 in such a way that the travel of liquid fuel floating down the walls 13 is prolonged and as most as possible of the liquid fuel is atomized or evaporated. Since the liquid fuel, especially directly after the inlet hole 8, splashes down the pre-evaporator 9, the liquid fuel and the droplets will ricochet from wall 13 to wall 13 and eventually hit the protruding rods 12, the arrangement will help to fully atomize and evaporate the liquid fuel and as such be a fine substitute for a spray injector. It has to be noted that the walls 13 are also heated and forms heating elements for heating and evaporating the liquid fuel. The protruding rods 12, which serves as heating elements, are as well as the walls 13 specially adapted for atomizing the liquid fuel and prolonging the travel of liquid fuel when it floats down the pre-evaporator 9. Experiments have shown that the quadratic shape of the protruding rods 12 have a fine effect on the atomization and evaporation of the liquid fuel. Triangular shapes also works fine. However, more edges support the capture of the drop and thus the time the drop is being subject to heating. The shapes of the edges are thus forming a nose 20 adapted for letting the remaining liquid fuel drip and thus because of gravity collide with protruding parts in the evaporator cavity, this nose 20 being arranged either on a rod-like heating element or a wall. As can be seen from FIG. 3, the nose can be applied on the rod-like heating element and/or on the wall.

The gaps 11 also serve as nozzles that because of the increased pressure helps the liquid fuel to evaporate and to keep the gas phase through the travel of the channel of the burner fuel evaporator facility 7.

A special pressure nozzle 14 is provided as the outlet of the pre-evaporator. Because of the small passage, the pressure nozzle 14 provides a pressure fall that serves to blow leftovers of atomized liquid fuel further into a vertical channel that is the pathway 15 to the evaporator labyrinth channel 16 in which the atomized and evaporated fuel is further heated into a homogeneous gas mist. Since the pressure through the pressure nozzle 14 is considerable high, the effect is that it serves as a spray injection unit for the evaporator but without the previously mentioned drawbacks since it is a completely integrated feature of the burner fuel evaporator facility 7. The outlet 17 of the burner fuel evaporator leads directly to a cavity 18 that encloses the burner. Small injection nozzles 19 are provided for jet streaming the evaporated fuel in front of the burner, here preferably being a monolith.

For the understanding of the system, the system components are build as modules that can be fixed together by conventional screws and bolts. Pathways for e.g. exhaust gas are forwarded from module to module in order to take out as much thermal energy as possible and get a high efficacy of the system. Thus the modules can be joined using gaskets in-between as can be seen in FIG. 1 between the evaporator module 5 and reformer module 6.

The modules can be made by machining of a bar of material or by extrusion, die-casting or sintering etc. In the present embodiment, the evaporator module is provided using a bar of aluminum and carving out the channels for the evaporator on a first side of the bar.

Provided by the invention is an enhanced system for evaporating the liquid fuel using a burner fuel evaporator facility 7, which partly evaporates the fuel, followed by a nozzle 14, which atomizes the fuel into a fine mist, before being passed to the final evaporation zone 16 and let to the burner via the injection nozzles 19.

The invention claimed is:

1. A fuel cell system, comprising:
a fuel cell stack comprising a plurality of proton exchange membrane fuel cells each featuring electrodes in the form of an anode and a cathode for delivering an electric current, wherein a reaction of free hydrogen into ionic form with contact to the anode being proportional to a flow of electric current between the electrodes;
a catalytic reformer;
an evaporator for evaporating a mixture of methanol and water to be fed through the catalytic reformer for producing portions of free hydrogen;
a fluid fuel burner for providing heat for heating the system to a temperature level at which the fuel cell system can enter a state of steady current production;
a burner fuel evaporator for heating of liquid fuel for the burner, the burner fuel evaporator being arranged in proximity to the burner in such a way that the burner fuel evaporator absorbs energy in the form of thermal heat from the burner in order to accelerate evaporation of liquid fuel into a fine mist of fuel to be delivered to the burner for producing thermal heat, wherein the burner fuel evaporator comprises:
a first section forming a pre-evaporator, the pre-evaporator having a plurality of chambers, each chamber having a gap to pass the liquid fuel therethrough to partly evaporate the liquid fuel into drops, droplets and mist, the first section having a pressure nozzle for two-phase atomization of the liquid fuel into a second section having a lower pressure, the second section providing a path for further heating and stabilizing the liquid fuel into a gas phase before being delivered to the burner.

2. The system according to claim 1, wherein the nozzle atomizes the liquid fuel into a fine mist.

3. The system according to claim 1, wherein the pre-evaporator is formed by at least one cavity with substantially vertical orientated walls within which cavity is arranged at least one protruding rod, the walls and the at least one protruding rod forming heating elements for heating the liquid fuel.

4. The system according to claim 3, wherein the liquid fuel is forced into the cavity because of gravity and ricochets between the walls to atomize and evaporate the drops of liquid fuel into drops, droplets and mist.

5. The system according to claim 3, wherein the at least one protruding rod forms heating elements and is arranged to protrude in all directions within the evaporator cavity.

6. The system according to claim 3, wherein the at least one protruding rod forms heating elements and is formed with a plurality of sides.

7. The system according to claim 3, wherein a shape of the sides of the at least one protruding rod forms heating elements and varies from being flat to a curved or concave form.

8. The system according to claim 3, wherein the walls and the at least one protruding rod have edges forming a nose adapted for letting remaining liquid fuel form drops that, because of gravity, collide with protruding parts in the evaporator cavity.

9. The system according to claim 3, wherein the at least one protruding rod forms a plurality of heating elements that are arranged in a matrix within the evaporator cavity.

10. The system according to claim 3, wherein the at least one protruding rod forms a plurality of heating elements that are arranged as a grate comprising at least one rod-formed heating element.

11. The system according to claim 10, wherein the grate is formed as a net with a plurality of rod-formed heating elements arranged side by side and arranged crossing each other.

12. The system according to claim 11, wherein the grate includes sets of rod-formed heating elements joined together to form joints where rod-formed heating elements cross each other.

13. The system according to claim 3, wherein the pre-evaporator is separated into a plurality of chambers, each chamber comprising a gap for passing the liquid fuel drop, a negative angled substantially vertical portion of a wall followed by a positive angled substantially vertical portion of a wall followed by a gap that leads to another one of the chambers.

14. The system according to claim 3, wherein the pre-evaporator chamber has at least two mirrored sets of walls and the rod-like heating elements are arranged between the walls.

15. The system according to claim 1, wherein the nozzle is formed by a passage with decreased cross section followed by a passage with a larger cross section for providing a pressure drop that provides atomization of liquid fuel into mist.

16. The system according to claim 1, wherein the evaporator for heating of liquid fuel for being passed to the reformer is arranged in such a way that the evaporator for heating of liquid fuel can absorb energy in the form of thermal heat from the burner in order to accelerate evaporation of liquid fuel into a fine mist of fuel to be led to the reformer for facilitating startup of the fuel cell system.

17. The system according to claim 1, wherein the reformer is operable to reform the liquid fuel into a syngas to be passed to the fuel cell stack and is arranged in such a way that the reformer can absorb energy in form of thermal heat from the burner for facilitating startup of the fuel cell system.

18. The system according to claim 1, further comprising a cooling system to cool the fuel cell stack, the cooling system including a radiator arranged in such a way that the radiator can absorb energy in form of thermal heat from the burner for facilitating startup of the fuel cell system.

19. A fuel cell system, comprising:
a fuel cell stack comprising a plurality of proton exchange membrane fuel cells, each fuel cell comprising an anode and a cathode to deliver an electric current, wherein a reaction of free hydrogen into ionic form when contacting the anode is proportional to a flow of electric current between the anode and cathode;
a catalytic reformer;
an evaporator to evaporate a mixture of methanol and water to be fed through the catalytic reformer as a fuel to produce portions of free hydrogen;
a fuel burner to heat the system to a temperature level at which the fuel cell system can enter a state of steady current production;
a burner fuel evaporator to heat the liquid fuel for the burner, the burner fuel evaporator being arranged in proximity to the burner so that the burner fuel evaporator absorbs thermal heat from the burner in order to accelerate evaporation of liquid fuel into a mist of fuel, the mist of fuel being delivered to the burner for producing heat, the burner fuel evaporator including a vertically oriented cavity and a plurality of droplet supporting edges exposed within the cavity, the droplet supporting edges being arranged and configured to collect drops of the liquid fuel passing through the cavity, wherein the drops of liquid fuel drip from the droplet supporting edges under the force of gravity.

* * * * *